(12) United States Patent
Figge et al.

(10) Patent No.: US 7,739,234 B1
(45) Date of Patent: Jun. 15, 2010

(54) TECHNIQUES FOR SYNCHRONIZING DATA STORE TABLES

(75) Inventors: Jason Figge, Pittsboro, NC (US);
Michael Chaves, Cary, NC (US);
Dennis Tackett, Youngsville, NC (US);
Sean Pritchard, Clayton, NC (US);
Anish Shah, Apex, NC (US); Jeffrey Canna, Raleigh, NC (US); Harold Lee, Holly Springs, NC (US); Alex Chapman, Holly Springs, NC (US);
Anil Peres-da-Silva, Carrboro, NC (US)

(73) Assignee: Teradata US, Inc., Miamisburg, OH (US)

( * ) Notice: Subject to any disclaimer, the term of this patent is extended or adjusted under 35 U.S.C. 154(b) by 224 days.

(21) Appl. No.: 11/304,173

(22) Filed: Dec. 15, 2005

(51) Int. Cl.
*G06F 17/00* (2006.01)

(52) U.S. Cl. .................................................. 707/610

(58) Field of Classification Search .............. 707/4, 707/203
See application file for complete search history.

(56) References Cited

U.S. PATENT DOCUMENTS

| | | | | |
|---|---|---|---|---|
| 4,875,159 A | | 10/1989 | Cary et al. | |
| 5,047,918 A | * | 9/1991 | Schwartz et al. | 707/203 |
| 5,142,470 A | | 8/1992 | Bristow et al. | |
| 5,623,679 A | * | 4/1997 | Rivette et al. | 715/255 |
| 5,623,681 A | * | 4/1997 | Rivette et al. | 715/255 |
| 5,684,984 A | * | 11/1997 | Jones et al. | 707/10 |
| 5,689,706 A | * | 11/1997 | Rao et al. | 707/201 |
| 5,721,914 A | * | 2/1998 | DeVries | 707/10 |
| 5,778,388 A | | 7/1998 | Kawamura et al. | |
| 5,870,733 A | | 2/1999 | Bass et al. | |
| 5,870,765 A | * | 2/1999 | Bauer et al. | 707/203 |
| 5,924,098 A | * | 7/1999 | Kluge | 707/100 |
| 5,926,816 A | * | 7/1999 | Bauer et al. | 707/8 |
| 5,951,652 A | * | 9/1999 | Ingrassia et al. | 709/248 |
| 5,974,238 A | * | 10/1999 | Chase, Jr. | 709/248 |
| 6,073,141 A | | 6/2000 | Salazar | |
| 6,081,806 A | * | 6/2000 | Chang et al. | 707/8 |
| 6,141,664 A | * | 10/2000 | Boothby | 707/201 |
| 6,295,541 B1 | * | 9/2001 | Bodnar et al. | 707/203 |
| 6,330,568 B1 | * | 12/2001 | Boothby et al. | 707/201 |
| 6,401,104 B1 | * | 6/2002 | LaRue et al. | 707/203 |
| 6,493,725 B1 | * | 12/2002 | Iwai et al. | 707/200 |
| 6,567,798 B1 | * | 5/2003 | Hollberg et al. | 707/2 |
| 6,721,871 B2 | * | 4/2004 | Piispanen et al. | 712/1 |
| 6,757,696 B2 | * | 6/2004 | Multer et al. | 707/201 |
| 6,799,190 B1 | * | 9/2004 | Boothby | 707/204 |
| 7,127,477 B2 | * | 10/2006 | Duncombe et al. | 707/203 |
| 7,146,617 B2 | * | 12/2006 | Mukundan et al. | 719/330 |
| 7,181,472 B2 | * | 2/2007 | Cameron et al. | 707/201 |
| 7,216,133 B2 | * | 5/2007 | Wu et al. | 707/203 |
| 7,216,134 B2 | * | 5/2007 | Starbuck | 707/203 |
| 2003/0182325 A1 | * | 9/2003 | Manley et al. | 707/204 |
| 2004/0044704 A1 | * | 3/2004 | Lee et al. | 707/203 |
| 2004/0098546 A1 | * | 5/2004 | Bashant et al. | 711/156 |

(Continued)

*Primary Examiner*—John R. Cottingham
*Assistant Examiner*—Mohammed R Uddin
(74) *Attorney, Agent, or Firm*—Schwegman, Lundberg, Woessner

(57) ABSTRACT

Techniques are presented for synchronizing data store tables. Elements of first tables are linked together to form dependent chains. The dependencies are not housed with the elements in the first tables; rather, the dependencies are housed in multiple second tables. Each second table maps one of the elements from one of the first tables to another of the elements in another of the first tables.

11 Claims, 3 Drawing Sheets

U.S. PATENT DOCUMENTS

2004/0225731 A1* 11/2004 Piispanen et al. ............ 709/224
2006/0026198 A1* 2/2006 Emery et al. ............ 707/103 R
2006/0123010 A1* 6/2006 Landry et al. ................. 707/10
2006/0155776 A1* 7/2006 Aust .......................... 707/201
2007/0100834 A1* 5/2007 Landry et al. ................. 707/10
2007/0156789 A1* 7/2007 Semerdzhiev et al. ....... 707/204

* cited by examiner

TECHNIQUES FOR SYNCHRONIZING DATA STORE TABLES

FIELD

The invention relates generally to data processing and more particularly to techniques for synchronizing data store tables.

BACKGROUND

Information is the life blood of an enterprise. The advent of technology has allowed information to be collected in real time and has allowed for the quantity and variety of information to appear boundless. An enterprise will collect, organize, analyze, mine, and report its information in an attempt to better plan and operate the enterprise. The information may also be used to increase knowledge of customers to thereby increase customer loyalty and revenues.

One challenge with the abundance of information is processing large volumes of data in practical and useful time frames. Another challenge is integrating information that may be housed in a variety of different databases, tables, or locations and keeping that information in synchronization.

When information is integrated if can provide valuable insights to the enterprise. One technique for this is for an enterprise to place pointers or links in one data store table to point to another data store table that is being integrated or linked in some logical fashion. These links can grow very large and span multiple tables and perhaps data sources. If a single element in one of the table's changes, then each table in the list has to be visited and updated to reflect the new change. This can create a serious synchronization bottleneck and is especially problematic when versioning of information is being maintained within each of the independent tables, such that when a change is made the previous version is still maintained as a prior version.

Thus, it can be seen that improved techniques for synchronizing data are desirable.

SUMMARY

In various embodiments, techniques for synchronizing data store tables are provided. In an embodiment, an update to an entry in a table is received and a new entry within the table is created to house the updated entry. Next, it is determined that the entry is part of a chain of linked other tables. The chain is traversed to obtain a next to last table, which points to the entry; and a mapping table is acquired for the next to last table. Finally, an updated entry is added in the mapping table to link to the new entry.

DETAILED DESCRIPTION

Figure 1:
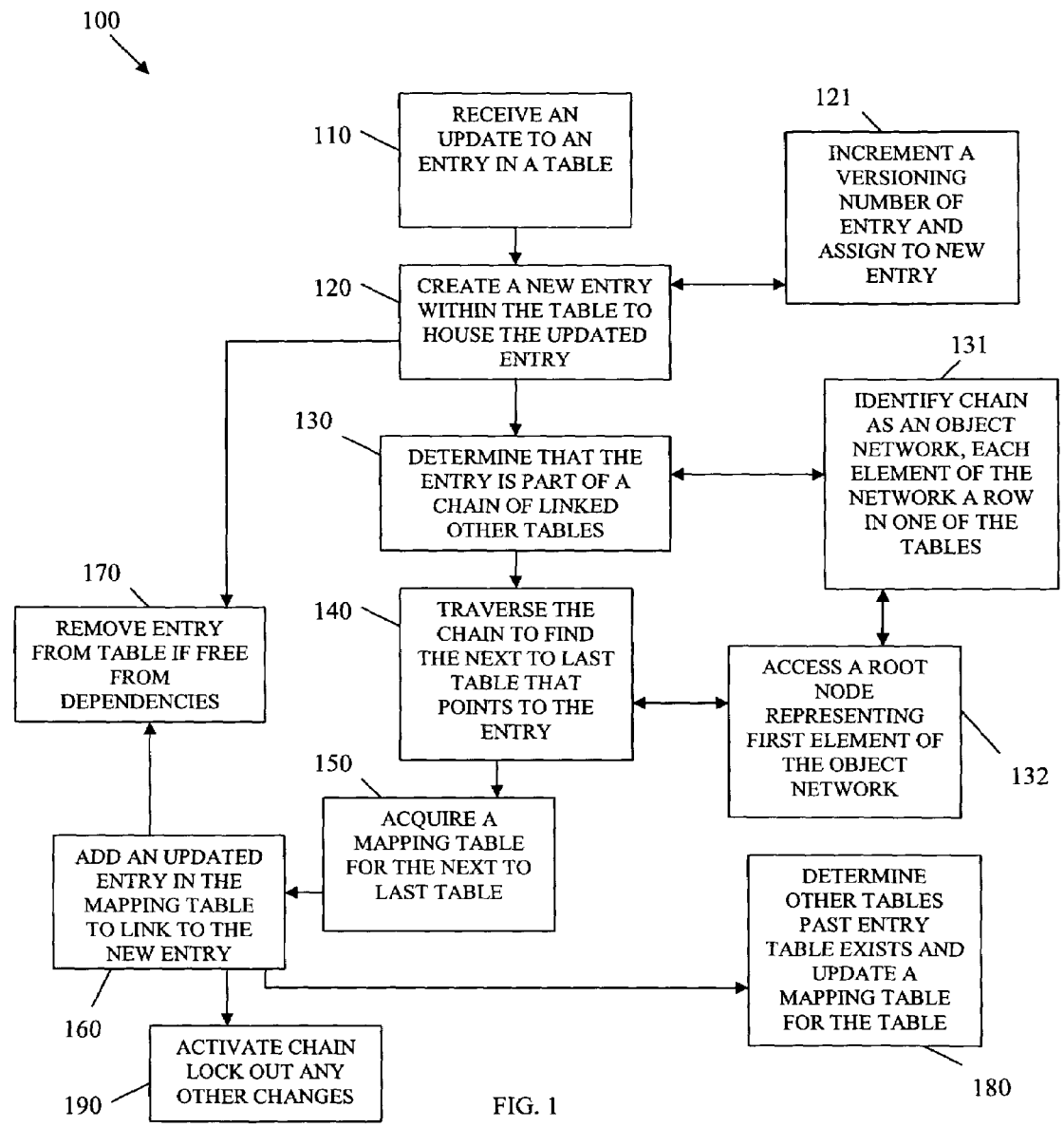
FIG. 1 is a diagram of a method for synchronizing tables, according to an example embodiment.

FIG. 1 is a diagram of a method 100 for synchronizing tables, according to an example embodiment. The method 100 (hereinafter "table synchronization service") is implemented in a machine-accessible or computer-readable medium and is accessible over a network. The network may be wired, wireless, or a combination of wired and wireless.

As used herein "an object network" is a logical linked list of elements from a plurality of data store tables. The elements may be viewed as a particular row or in some cases a particular field of a particular row within a given table. The data store may be viewed as one or more relational databases, objected oriented databases, directories, data warehouses, and/or various combinations of these. According to an embodiment, the data store is a Teradata® data warehouse, distributed by NCR Corporation of Dayton, Ohio.

So, the object network may be viewed as a chain or list of related rows from a variety of data store tables. Accordingly, large numbers of elements from disparate tables may be grouped together logically and may be viewed and processed as a single component, namely an instance of an object network.

An object network may be versioned. Versioning, in this context, refers to the ability to change the definition or state of an active object network instance. Once an instance of an object network is activated and validated it is locked and changes are no longer permitted, unless a new version of the object network is created, which entails a different instance of that object network.

Any particular instance of an object network may be defined or referenced via its root element or object. The root object may also be referred to as an object network's top level. In a sense, reference to the top level or first element of an object network may be viewed as the object network's identifier.

As an example of an object network consider an employee that has multiple dependents (children and spouse). The employee object may map to a row in an employee table, whereas the dependent objects (children and spouse) may map to a set of rows in a separate employee dependents' table using a foreign key to the row in the employee table that identifies the employee. In such a case, the top level, identifier, or root object is a pointer to the employee object.

In still another example, consider a Customer Relationship Management (CRM) object network (may also be called a "communication"). The Communication objects contain collections of Segment Definitions and Communication Plan Definitions, each of which in turn contains their own internal set of definitions. These objects have corresponding rows in the CRM Communication, Segment, and Communication Plan Tables, with the relationships described as foreign keys, as appropriate.

Conventionally, the chains associated with an object network would be updated in a particular manner. That is, if an element changed then each table having an element of the object network would change to reflect the change. This created unnecessary duplication within the individual tables and created a lot of unnecessary database accesses and therefore processing. For example, consider four tables labeled A, B, C, and D that form an object network as such:

| Table A | Table B | Table C | Table D |
|---------|---------|---------|---------|
| A.1 –> B.1 | B.1 –> C.1 | C.1 –> D.1 | D.1 –> Z |

Where A, B, C, and D embedded within the tables identify a foreign key reference to an element within the corresponding table and the number (1) identifies a version number for the element within the table, and Z is a piece of data to be updated within the object network.

In the example, associated with a conventional technique, an update to Z to produce Z' in Table D, would entail accessing 4 tables A-D and adding a new entry to each as such:

| Table A | Table B | Table C | Table D |
|---------|---------|---------|---------|
| A.1 -> B.1 | B.1 -> C.1 | C.1 -> D.1 | D.1 -> Z |
| A.2 -> B.2 | B.2 -> C.2 | C.2 -> D.2 | D.2 -> Z' |

It is apparent in this example, that the process of synchronizing the change in the object network is cumbersome and inefficient.

Techniques presented herein substantially improve this processing. This is achieved by creating mapping tables for each transition in the object network and maintaining the dependencies in the mapping tables independent from the original tables that house the information.

For example, and as will be demonstrated herein and below in detail, in the previous example, the following tables would be initially generated for the object network before the update to Z as follows:

| Table A | Table B | Table C | Table D |
|---------|---------|---------|---------|
| A.1 | B.1 | C.1 | D.1 -> Z |

| A Map B | B Map C | C Map D |
|---------|---------|---------|
| A.1 -> B.1 | B.1 -> C.1 | C.1 -> D.1 |

Notice that there are now 7 tables the original 4 tables (A-D), which now do not include the object network's dependencies, and 3 mapping tables, which include the old dependencies that were originally included in the initial 4 tables (A-D).

Now if the change to Z is made to be Z', then only two tables require access and modification to synchronize that change; rather than 4 tables in the conventional approach. The two tables that would be changed would be Table D and the C Map D Table, such that the tables after the change are as follows:

| Table A | Table B | Table C | Table D |
|---------|---------|---------|---------|
| A.1 | B.1 | C.1 | D.1 -> Z |
|  |  |  | D.2 -> Z' |

| A Map B | B Map C | C Map D |
|---------|---------|---------|
| A.1 -> B.1 | B.1 -> C.1 | C.1 -> D.1 |
|  |  | C.1 -> D.2 |

Not only is processing throughput substantially reduced but added flexibility and extensibility are also provided with this technique. For instance, if C were also associated with another table E, then each reference where C pointed to D would have to include a redundant pointer to E. In the present solution, a C Map E table is created to achieve this association. This allows the data store environment to be more flexible and more extensible and provides the ability to add or remove functionality via changes to the mapping tables and not via changes to the raw data tables (A-E). Essentially, dependencies of tables are removed from the native data tables and stored in separate smaller more manageable mapping tables.

The processing and variations on the processing to achieve these benefits with data store processing in order to synchronize tables and maintain versioning control will now be discussed in detail with reference to FIG. 1 and in view of the processing associated with the table synchronization service.

At 110, the table synchronization service receives an update to an entry in a table. At 120, the table synchronization service creates a new entry within the table to house the updated entry. According to an embodiment, at 121, the original entry and the new entry may be associated with a versioning number. In such a situation, the original entry number and its versioning number is incremented by one and this incremented value is associated with the new entry within the table. An example of this was provided above with respect to Table D and the D.1→Z entry and the updated new entry in Table D of D2→Z'.

Next, at 130, the table synchronization service determines that the entry is part of a chain of linked other tables. At 131, this chain may be identified as an object network. Examples of object networks and their dependencies were discussed above. The object network has a plurality of elements; each element of the object network corresponds to a row in a different table.

Although in some instances, there may be two elements that correspond to two different rows located within a same table. At 132, access to the root node, root object, or top level of the object network may be achieved via a reference to the first element of the object network.

Determination of the entry being associated with a particular chain may be achieved in a variety of manners. For example, the table that houses the entry may include a field that identifies the root object or top level of any associated chain. Alternatively, a separate search associated with chains may reveal that a particular entry in the table is in fact associated with a chain of dependent tables. In fact any mechanism that permits the table synchronization service to quickly and efficiently determine that the entry, which was modified, is associated with a chain of dependent tables may be used.

At 140, the table synchronization service traverses the chain to find the next to last table that references the entry, which is being modified. That is, the top level that identifies the chain is traversed until the entry is reached and the next to last table, which was encountered before the entry and its table were reached is identified as the next to last table.

Once the identity of the next to last table is known, at 150, the table synchronization service acquires a mapping table of the next to last table using the identity of the next to last table and the table to which the entry that is being modified belongs. Within this mapping table for the next to last table, the entry is found that references the entry being modified and a new entry is added, at 160, to link that entry with the new entry of the table. An example of this was provided above, where C.1→D.1 in mapping table C Map D and the new entry would be C.1→D.2.

In some cases, at 170, the original entry that was modified or changed may no longer have any dependencies, meaning that no other entries reference that entry for external tables or from other chains (e.g., object networks). Under such circumstances, a policy may permit the entry in the table to be removed entirely from the table to which it relates.

According to an embodiment, at 180, the table synchronization service may determine that there are other tables that exist beyond the entry that was modified. In other words, the entry may have occurred within the middle or beginning of a chain of tables (object network). Here, the mapping table for the table that houses the entry may be modified to reflect that the changed or new entry now points to the proper next table in the chain. This is similar to an insertion and deletion of a list operation; although it is occurring on entries within an object network for purposes of synchronizing and versioning dependent table chains with one another.

In still another embodiment, at 190, the table synchronization service may determine that the new entry is associated with an instance of the chain or object network that is to be activated and locked down to prevent any further modifications. So, the new instance of the chain may be locked for production.

It is now appreciated how a more processing efficient, flexible, and extendible technique may be used to synchronize data store tables with one another when elements or entries of multiple tables are dependent upon one another. This is achieved via the addition of mapping tables that house the dependencies and separate the dependencies from the raw data tables. This makes collecting and organizing the raw data tables in customized manners more easily achievable and makes updating and changing those raw data tables an easier processing exercise. The individual dependencies of the tables are decoupled and removed from the raw tables and moved to smaller more focused and more manageable tables via the mapping tables.

Figure 2:
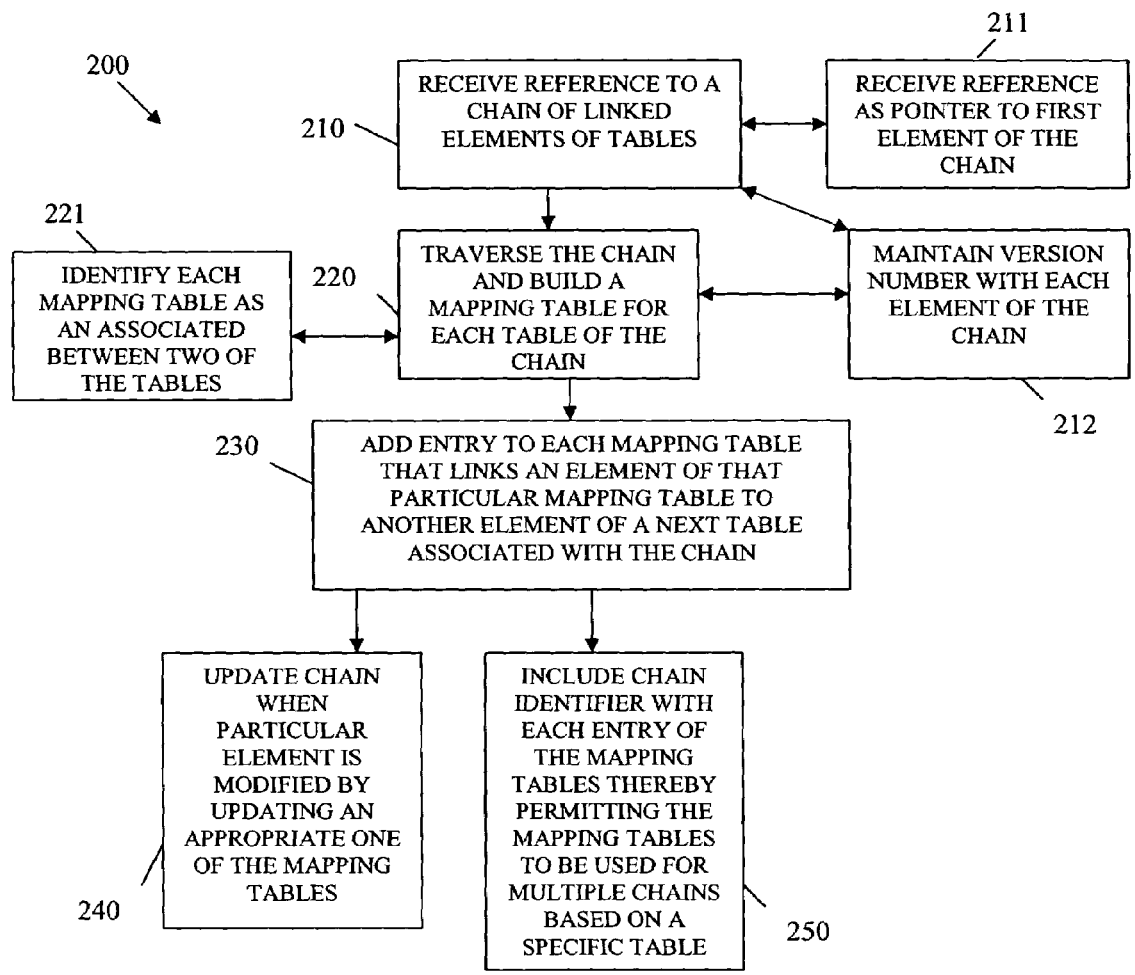
FIG. 2 is a diagram of another method for synchronizing tables, according to an example embodiment.

FIG. 2 is a diagram of another method 200 for synchronizing tables, according to an example embodiment. The method 200 (hereinafter "chain synchronization service") is implemented in a machine-accessible and readable medium and is accessible over a network. The network may be wired, wireless, or a combination of wired and wireless. In an embodiment, the chain synchronization service represents a different processing perspective of the table synchronization service represented by the method 100 of FIG. 1.

At 210, the chain synchronization service receives a reference to a chain of linked elements associated with multiple tables. This may be viewed as an instance of an object network, which was discussed herein and above. According to an embodiment, at 211, the chain synchronization service may receive the reference as a pointer to the first element of the chain. Additionally, at 212, the chain synchronization service may maintain a version number with each element of the chain.

At 220, the chain synchronization service traverses the chain and dynamically derives and/or builds a mapping table for each table referenced within the chain. At 221, each mapping table is a mapping between two tables. For example, in the above provided example there were 4 total tables A-D, the total number of mapping tables were 3 or N−1, where N was the total number of unique tables in the object chain. Each mapping table was a link between two of the tables, A to B, B to C, and C to D.

At 230, the chain synchronization service adds an entry to each mapping table. The entry links an element of one table to an element of another table associated with a next table of the chain. For example, the mapping table A.1→B.1 appears in mapping table A to B, the entry associated with A.1 includes the element A.1 of table A and links it to element B.1 in table B. The mapping tables provide links between elements of one table to elements of another table to which it is associated.

At 240, the chain synchronization service updates the chain when a particular element within the chain is modified by updating an appropriate one of the mapping tables and the table to which the update occurred. Again, an example of this was provided above when Table D was modified such that D.2→Z' was a new entry; this update necessitated a change to a single mapping table, namely C to D and it was updated with the new entry C.1→D.2.

According to an embodiment, at 250, it may be desirable to have a single mapping table for a plurality of different object networks. To do this, the root object or identifier of the chain (object network) may serve as a key into a particular mapping table and the proper linkage for that object network acquired. So if a table, say table A, participates with Table B in multiple object chains, then a single mapping table may exist and the proper maps acquired using a specific object network's identifier (reference to the root object or top level).

It is now understood how legacy and existing object networks or chains of dependent tables may be automatically ported to a processing environment that the method 100 of FIG. 1 describes. This means that legacy environments are more easily integrated and can quickly benefit from the teachings presented herein. To do this, the chains are evaluated and the dependencies are moved from their native tables to the mapping tables. The mapping tables may then be used in the manners discussed above to achieve better processing efficiency for synchronization and to provide a more flexible and extensible data store processing environment.

Figure 3:
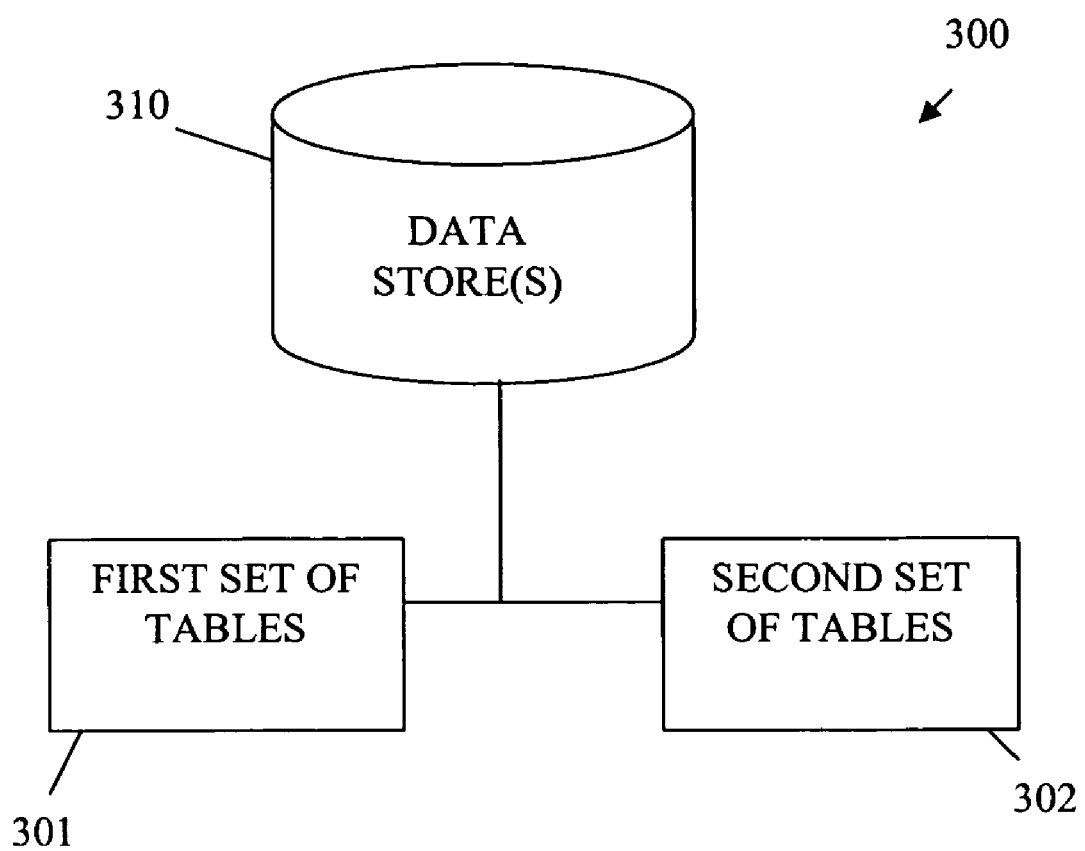
FIG. 3 is a diagram of a table synchronization system, according to an example embodiment.

FIG. 3 is a diagram of a table synchronization system 300, according to an example embodiment. The table synchronization system 300 is implemented in a machine-accessible and readable medium and is operational over a network. The network may be wired, wireless, or a combination of wired and wireless. In an embodiment, portions of the table synchronization system 300 represent, among other things data structures and results produced and managed by the methods 100 and 200 of the FIGS. 1 and 2, respectively.

The table synchronization system 300 includes a first set of tables 301 and a second set of tables 302. The first set of tables 301 and the second set of tables 302 are housed in one or more data stores 310. Each of these will now be discussed in turn.

The first set of tables 301 house data or information in elements, which are viewed as rows or fields of rows. The first set of tables 301 may span the same data store 310 or multiple different data stores 310. Dependencies between specific elements of specific tables to other ones of the tables within the first set of tables 310 for chains or object networks. The first element or top level object of an object network is the identifier for the object network.

Applications and/or users may form the dependencies that create the object networks. The object networks may pre-exist or may be created and they can be dynamically modified, changes are handled in the manners discussed herein. Additionally, any legacy representation of the object networks where the dependencies are represented with the elements of the first set of tables is modified to exclude these dependencies and to house them in the separate second set of tables 302.

Also, the elements of the first set of tables 310 may carry a versioning number with them, as described above with the example presented with respect to the method 100 of the FIG. 1.

The second set of tables 302 represent the dependencies that link elements in the first set of tables 301 with other elements also included within the first set of tables 301. Any particular table from the second set of tables 302 represents a mapping for one element in that particular table to another element in a different table.

According to an embodiment, the second set of tables 302 may be automatically and dynamically derived from an existing object network. The second set of tables 302 may also be dynamically evaluated to logically present and represent the object network represented from the first set of tables 301.

During operation of the table synchronization system 300, updates may occur to particular elements of particular tables associated with the first set of tables 301. When this is detected, the particular tables are updated to reflect the new elements or new versions of existing elements and the corresponding mapping tables of the second set of tables 302 are updated to include adjusted linkages.

In an embodiment, the total number of tables included in the second set of tables 302 is equal to the total number of first tables 301 minus one. This was described above and since there are N–1 dependencies that need represented for any given object network, only N–1 second tables are needed, where N is the total number of first tables.

The first and second sets of tables 301 and 302 may be managed and modified by the methods 100 and 200 of the FIGS. 1 and 2. Additionally, the second set of tables 302 may be created and derived initially by the method 200 of the FIG. 2.

It is now understood how dependencies of object networks may be decoupled from the native data store tables and synchronized in a novel manner using mapping tables that include those dependencies. This improves processing efficiency for synchronization and updates. It also provides a more flexible and extensible solution by decoupling the dependencies from the native tables.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable medium to execute on a computer, the method, comprising:
   receiving, by the computer, an update to an entry in a first original table of a relational database, wherein the entry is a particular field of a particular row of the first original table;
   creating, by the computer, a new entry within the first original table to house the updated entry;
   determining, by the computer, the entry is dependent on a chain of linked other original tables, the chain of linked other original tables forms a linked list, which includes pointers from each other table entry to another entry in another of the other original tables, the chain is also represented via another separate and independent set of mapping tables for transitions that maintain dependencies independent from the first table and the other original tables that house the entry and other entries, the other original tables do not include linked dependencies among one another, the dependencies are housed in the mapping tables and just two tables are accessed to update and to reflect the update to the entry occurring in the first original table, these two updates are a first update to the first original table to show the update for the entry and a second update to a next to last mapping table in the mapping tables, the next to last mapping table is a particular mapping table that points to the entry being updated in the first original table;
   traversing, by the computer, the chain to the next to last mapping table that points to the entry in the first original table;
   acquiring, by the computer, the particular mapping table for the next to last mapping table; and
   adding, by the computer, an updated entry in the particular mapping table to link to the updated entry appearing in the first original table.

2. The method of claim 1, wherein creating further includes incrementing a versioning number associated with the entry and associating the incremented versioning number with the new entry.

3. The method of claim 1, wherein determining further includes identifying the chain as an object network, wherein each element of the network is a row in one of the other original tables.

4. The method of claim 3, wherein traversing further includes accessing a root node representing a first element of the object network to begin traversing the object network.

5. The method of claim 1 further comprising, removing, by the computer, the entry from the first original table if the entry is free of dependencies.

6. A method implemented in a computer-readable medium to execute on a computer, the method, comprising:
   receiving, by the computer, a reference to a chain of linked elements of original database tables, the chain is a linked list that includes pointers from a root database table to a last database table;
   traversing, by the computer, the chain and building a plurality of separate and independent mapping tables, a total number of the mapping tables equal to a total number of the original database tables minus one, and there being one particular mapping table for each pair of database tables of the chain, the chain is associated with each mapping table and represents transitions and each mapping table maintaining dependencies independent from original database tables that house information; and
   adding, by the computer, an entry to a particular mapping table that links a first element of that particular mapping table to a second element of a next original database table associated with the chain, the first element included in a particular original database table that precedes the next original database table within the chain and the dependency that links the first element to the second element is defined in the particular mapping table, when an update is made to a field in a particular original database table, the particular original database table and remaining ones of the original database tables do not include dependencies that link the particular original database table and the remaining original database tables rather the dependencies of the linking between the particular original database table and the remaining original database tables are maintained in one of the mapping tables for the update, and when the update to the particular original database table occurs, two updates occur one to the particular original database table and another update to the one mapping table having the dependencies complete the update.

7. The method of claim 6 further comprising, maintaining, by the computer, a versioning number with each element of the chain.

8. The method of claim 6 further comprising, updating, by the computer, the chain when a particular element is modified by updating an appropriate one of the mapping tables.

9. The method of claim 6, wherein receiving further includes receiving the reference as a pointer to a first element of the chain.

10. The method of claim 6 further comprising, including, by the computer, a chain identifier with each of the entries of the mapping tables thereby allowing the mapping tables to be used for multiple chains based on a specific table.

11. The method of claim 6 further comprising, identifying, by the computer, each mapping table as an association between two of the original database tables.

\* \* \* \* \*